United States Patent [19]
Crosbie et al.

[11] Patent Number: 4,732,746
[45] Date of Patent: Mar. 22, 1988

[54] METHOD OF MAKING HIGH PURITY SILICON NITRIDE PRECURSOR

[75] Inventors: Gary M. Crosbie, Dearborn; Ronald L. Predmesky, Redford, both of Mich.

[73] Assignee: Ford Motor Company, Dearborn, Mich.

[21] Appl. No.: 853,539

[22] Filed: Apr. 18, 1986

[51] Int. Cl.$^4$ .............................................. C01B 33/00
[52] U.S. Cl. ..................................... 423/324; 423/344; 423/351; 423/371
[58] Field of Search ................. 423/324, 351, 371, 344

[56] References Cited

U.S. PATENT DOCUMENTS

| | | | |
|---|---|---|---|
| 3,959,446 | 5/1976 | Mazdiyasni | 423/334 |
| 4,145,224 | 3/1979 | Mechalchick | 501/97 |
| 4,196,178 | 4/1980 | Iwai et al. | 423/344 |
| 4,387,079 | 6/1983 | Kasai et al. | 423/324 |

OTHER PUBLICATIONS

Kato et al., "Finely Divided Silicon Nitride by Vapor Phase Reaction Between Silicon Tetrachloride and Ammonia", Yogyo Kyokaishi 80 (3) 28-34 (1972).

Primary Examiner—John Doll
Assistant Examiner—Lori S. Freeman
Attorney, Agent, or Firm—Joseph W. Malleck; Roger L. May

[57] ABSTRACT

A method of economically making silicon nitride precursor, comprising: (a) reacting silicon halide vapor with liquid ammonia at a situs (i.e., at a temperature of −20° to +40° C.) in an inert environment having a pressure equal to or greater than 35 psig, which environment is effectively devoid of organic contaminants, said reaction producing a mixture of precipitated silicon imide in liquid ammonia having dissolved ammonium halide; (b) extracting a portion of the mixture from the situs; and (c) separating the precipitate from the liquid of the portion. Preferably the silicon halide is $SiCl_4$ and its vapor is brought into reaction with the liquid ammonia by way of a nonreactive carrier gas ($N_2$ or argon). The proportioning of the $SiCl_4$ and liquid ammonia is effective so that the exothermic heat of chloride-ammonia reaction substantially offsets the latent heat of vaporization of the ammonia into the residual carrier gas to provide a neutral heat balance or slight overall endothermic heat transfer.

14 Claims, 5 Drawing Figures

FIG. 2
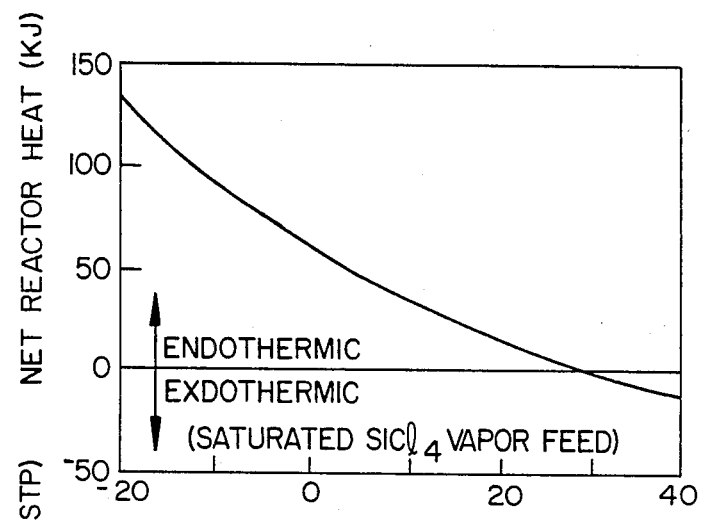
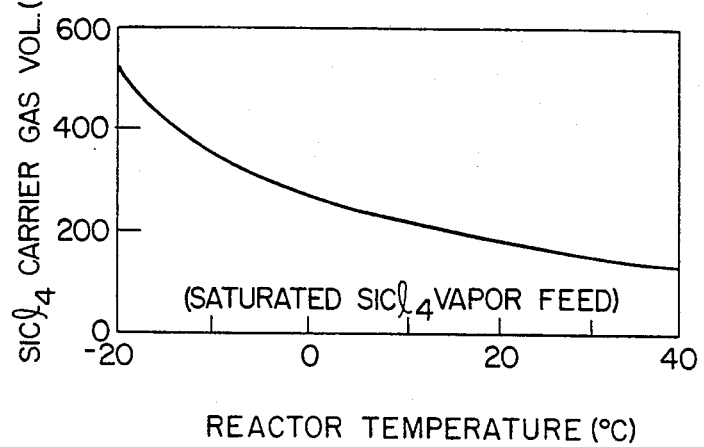
FIG. 3

METHOD OF MAKING HIGH PURITY SILICON NITRIDE PRECURSOR

BACKGROUND OF THE INVENTION

1. Field of the Invention

This invention relates to the process and apparatus for making silicon imide which is useful as a precursor for making silicon nitride and, more particularly, to a process which achieves economical control of the exothermic reaction between silicon halide and ammonia without contamination of the resulting precursor by organics.

2. Description of the Prior Art

The prior art processes have utilized various modes of synthesizing silicon nitride precursor for making silicon nitride by thermal decomposition. The various prior art modes for making such precursor have utilized the reaction of $SiCl_4$ with ammonia either at low or high temperatures. Such modes can be classified generally as follows: (a) a reaction between a liquid phase containing $SiCl_4$ and liquid ammonia either at normal ambient pressure conditions or at elevated pressure conditions; (b) vapor $SiCl_4$ and gaseous ammonia at highly elevated temperatures; (c) a liquid phase containing $SiCl_4$ and gaseous ammonia; and (d) condensed vapor $SiCl_4$ and solid ammonia.

The first mode is best represented by the teachings of Ube Industries, Ltd. (disclosed in U.S. Pat. No. 4,196,178) wherein a metallic halide is reacted with liquid ammonia in the presence of an organic solvent. Unfortunately, the presence of the organic solvent contaminates the imide product, the organic solvent being so necessary for this patent to control the extremely exothermic all liquid reaction when operating about ambient or lower temperatures; the evolution of a considerable amount of heat makes the reaction highly uncontrollable and unsuitable for scale-up when organics are not present. Without some agent for control, the low temperature reaction between liquid $SiCl_4$ and liquid $NH_3$ is violent. The highly exothermic reaction is seen as responsible for several processing difficulties such as loss of temperature control, nonuniform product, and inlet port clogging. Additionally, scale-up of the reaction of liquid $SiCl_4$ with liquid ammonia suffers due to limitations of heat extraction for larger equipment from greater heat evolution from greater volumes.

Other authors have also turned to diluting $SiCl_4$ in an organic liquid (such as benzene, hexane or toluene) before contacting the liquid ammonia. Such dilution of $SiCl_4$ with an organic which moderates the reaction, and has been described by: (1) Ebsworth, "Volatile Silicon Compounds", Pergamon Press, Ltd., MacMillan, New York 1963, p. 116; and (2) Sato in Japanese Kokai Tokkyo Koho No. 79,134,098, Apr. 11, 1978, listed in Chem. Abstracts as 92:113132n, "Silicon Nitride". In the latter reference, $SiCl_4$ is diluted with $CCl_4$ before reaction with ammonia. The dilution allows time for the heat of reaction to be carried away from the reaction interface. Unfortunately, it also brings the organic liquid into contact with the newly formed high surface area imide, which contact results in carbon contamination of the silicon nitride product and which contamination affects, in technically undesirable ways, the dielectric, optical and high temperature phase equilibria within silicon nitride and its alloy compositions. Carbon contamination is also detrimental to second phase oxynitride development and thermal stability.

To avoid the presence of the organic solvent, U.S. application Ser. No. 812,036, assigned to the assignee of this invention, teaches that using an excess of liquid ammonia while conducting the reaction at critically low temperatures, while continuously removing a certain portion of the liquid ammonia containing dissolved byproducts of the reaction, will tend to moderate the thermal reaction but still require considerable cooling at subcritical temperatures; the latter can be highly troublesome from a commercial standpoint.

At high reaction temperatures, necessary for mode (b), undesired bonding of the halide (such as chlorine) to silicon and hydrogen ions will occur (see Mechalchick in U.S. Pat. No. 4,145,224; Kato et al "Finely Divided Silicon Nitride By Vapor Phase Reaction Between Silicon Tetrachloride and Ammonia", Yogyo Kyokaishi 80 (3) 28–34 (1972). Such a high temperature reaction produces hydrogen and chlorine contaminated silicon nitride rather than the imide precursor. If the contaminated nitride is heated sufficiently (around 1500° C.) to break the N-H and Si-Cl bonds, an agglomerated fibrous powder will result, requiring extensive milling before ceramic processing use, the milling adding consequential milling media contamination.

With respect to mode (c), liquid silicon tetrachloride has been reacted with an excess of ammonia gas in dry, deoxygenated benzene or normal hexane at about 0° C. as described by Mazdiyasni in U.S. Pat. No. 3,959,446. This process suffers from the same difficulties described in connection the use of organic solvents in a liquid to liquid reaction. In the French article by E. Vigouroux and C. R. Hugot, Seances Academy Sciences, Vol. 186, p. 1670 (1903), liquid silicon chloride was reacted with gaseous ammonia at a low temperature. This mode generates enormous heat, but the authors never state the particular temperature range of the reaction during processing. The review of the technical literature by these authors indicates that there is a considerable lack of control of the reaction and the various byproducts resulting therefrom. Their research work corroborates such lack of control.

The last mode (d), is disclosed in the article by O. Glemser and P. Naumann, "Uber den Thermischen Abbau Von Siliciundiimid $Si(NH)_2$", Z. Anorg. Allg. Chem., 298 134–41 (1959). In this German article, $SiCl_4$ is transported and condensed as a solid on solid ammonia at minus 196° C. Tremendous heat is generated as the ammonia begins to thaw. The reaction is highly uncontrollable because upon the thawing of the ammonia, the only way to control the reaction is to limit quantities of reactants. The process is converted into a series of complex reversion steps, whereby the reaction flask is warmed to near boiling point then cooled again to maintain some degree of temperature control. Complexity of heating and cooling, stopping and starting, is only possible on a laboratory scale and cannot be reasonably used in commercial production.

The ability to economically control the thermal reaction must be solved with a view towards maintaining high purity of the resulting intermediate imide product of such reaction. Heretofore, attempts to solve the thermal control problem have resulted in greater contamination such as carbon contamination through use of organic liquids (such as benzene, hexane or toluene). Similarly, when the reaction was elevated in temperature to carry out vapor reactions, chloride and hydrogen contamination, with strong bonding between silicon and chlorine, and between nitrogen and hydrogen, occurred with such high temperatures reactions. Thermal decomposition of the product at extremely high temperatures broke the bonding between the nitrogen, hydrogen, silicon and chlorine bonds, but resulted in agglomerated, fibrous powders requiring extensive milling before ceramic processing use.

SUMMARY OF THE INVENTION

A primary object of this invention is to synthesize silicon imide without use of organic compounds at operating temperatures which avoid supercooling complexities.

Another object is to synthesize silicon imide by the reaction of silicon halide introduced into contact with liquid ammonia in a carrier gas and in a manner to offset the exothermic heat of chloride-ammonia reaction of such process with the latent heat of vaporization of liquid ammonia into the carrier gas.

The invention is a method of economically making silicon nitride precursor, comprising: (a) reacting silicon halide vapor with liquid ammonia at a situs in an inert environment having a pressure equal to or greater than 35 psig, which environment is effectively devoid of organic contaminants, said reaction producing a mixture of precipitated silicon imide in liquid ammonia having dissolved ammonium halide; (b) extracting a portion of the mixture from the situs; and (c) separating the precipitate from the liquid of the portion.

Preferably the silicon halide is $SiCl_4$ and its vapor is brought into reaction with the liquid ammonia by way of a nonreactive carrier gas. The proportioning of the $SiCl_4$ and liquid ammonia is effective so that the exothermic heat of chloride-ammonia reaction substantially offsets the latent heat of vaporization of the ammonia into the residual carrier gas to provide a substantially neutral heat balance or slight overall endothermic heat transfer.

Preferably the temperature of the environment for said reaction is maintained in the range of $-20°$ to $+40°$ C. and advantageously the pressure of said environment is maintained in the range of 50-250 psig.

The carrier gas effectively can be nitrogen or argon, and the reaction situs can be formed by metallic tubes or containers.

Preferably the extracted portion is transferred anerobically from said reaction situs to a conically shaped zone for concentrating the precipitate therein by gravity, and withdrawing the precipitate from said zone along with a small proportion of liquid. Advantageously, the conical zone reduces the halide content in the extracted portion by at least a factor 10.

Preferably the interacting molar ratio of ammonia to $SiCl_4$ is in the range of 18-200.

The product resulting from the practice of the above method is characterized by a purity (with respect to anions, except chlorine, and cations as well as organic impurities) which is greater than 99%, an oxygen content less than 0.35%, a HC content less than 0.035%, and cation impurities less than 400 ppm. The precipitate has a fluffy, nonagglomerated condition and has the capability to be thermally decomposed, preferably to at least 90% alpha silicon nitride. The $Si_3N_4$ produced therefrom has an average particle size of less than one micron but substantially close to one micron. The particles are also substantially equiaxed in shape and the product.

SUMMARY OF THE DRAWINGS

FIG. 2 is a graphical illustration of the variation of reactor heat and temperature for reacting vapor $SiCl_4$ with liquid $NH_3$;

FIG. 3 is a graphical illustration of the variation of carrier gas volume with reactor temperature for the reaction of vapor $SiCl_4$ and liquid $NH_3$.

DETAILED DESCRIPTION AND BEST MODE

The method of this invention is to synthesize silicon imide as an improved silicon nitride precursor. It comprises the steps of: (a) adding $SiCl_4$ vapor to liquid ammonia at a situs in an inert environment and at a sufficiently high rate to form a mixture of precipitated imide in said liquid ammonia having dissolved ammonium chloride, the environment having a pressure equal to or greater than 35 psig and being effectively devoid of organic contaminants; (b) extracting a portion of the mixture as a concentrated slurry of the precipitate in said liquid ammonia; and (c) separating said imide precipitate from said liquid.

Saturator

Figure 1:
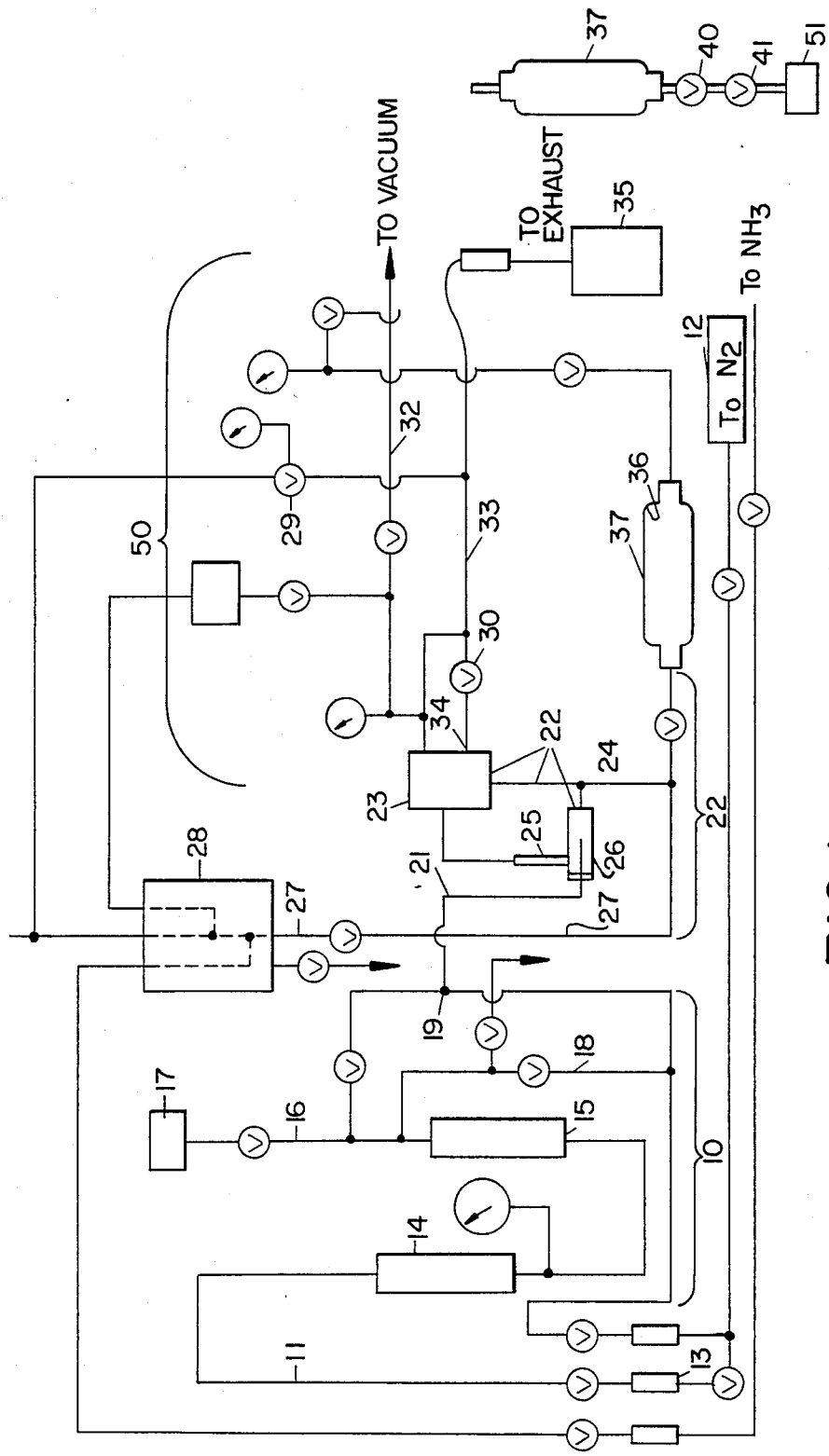
FIG. 1 is a schematic illustration of the equipment system for carrying out the process of this invention.
Figure 4:
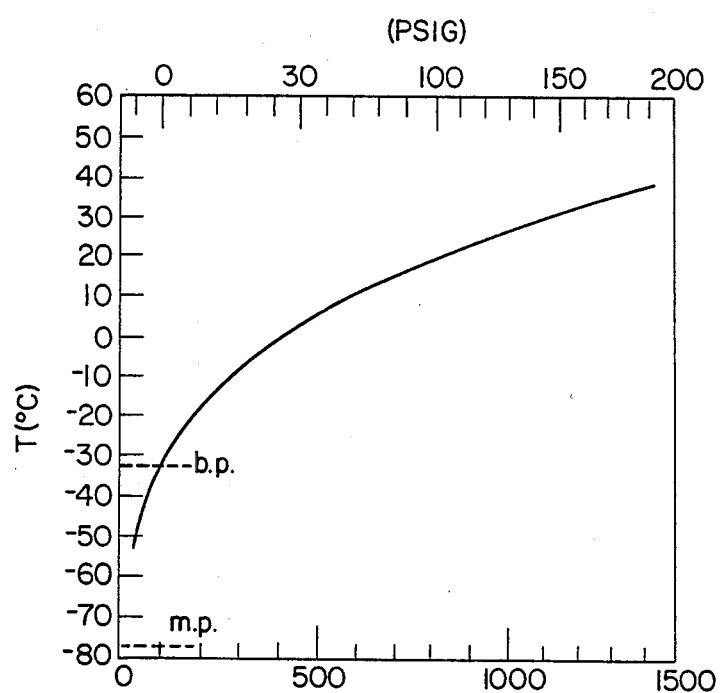
FIGS. 4 and 5 are, respectively, graphical illustrations of the variation of partial pressure of $NH_3$ with temperature and partial pressure of $SiCl_4$ with temperature.
Figure 5:
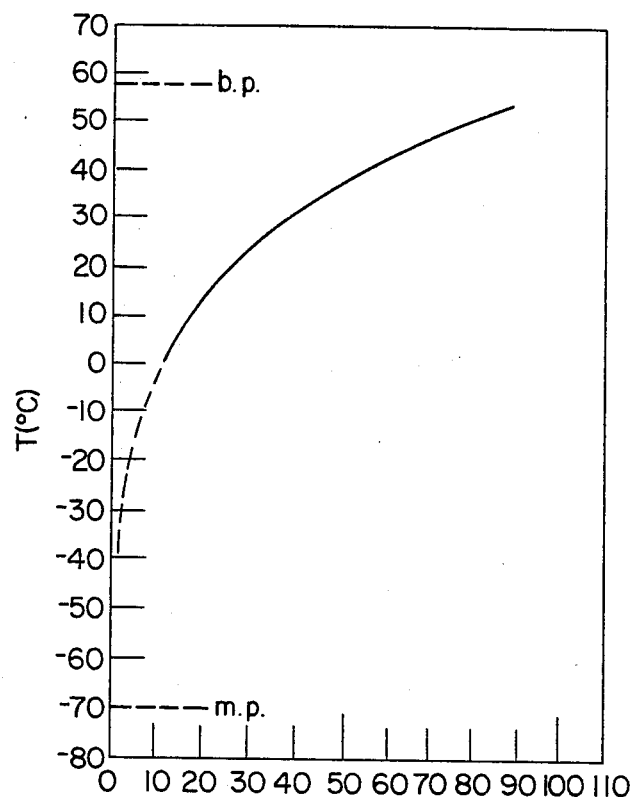

As shown in FIG. 1, a saturator 10 is used to carry the vapor of $SiCl_4$ to the reaction situs in a nonreactive carrier gas stream, such as nitrogen or argon. The $SiCl_4$ vapor is introduced into the carrier gas by forcing nitrogen gas (carried by conduit 11 from a source 12, regulated in flow at 13, and filtered at 14 by a trap) through a bubbling vessel 15 containing liquid $SiCl_4$, the bubbling of the nitrogen therethrough sweeping up the vapor of $SiCl_4$. The saturator is filled with liquid $SiCl_4$ (having a vapor pressure of about 40 rPa at room temperature) through conduit 16 from access 17. The fraction of saturation of the carrier gas by $SiCl_4$ is preferably about 1 after dilution with the $N_2$ (bypass) and after cooling to the reaction temperature. The nitrogen gas can be typically introduced to the saturator vessel 15 at a flow rate of about 0.4 liters of nitrogen gas per minute. A second stream of nitrogen gas is also bypassed around the saturator at 18 at a flow rate of about 1.36 liters per minute to be mixed with and dilute the saturated carrier gas at 19 and thereby to obtain the desired fraction of saturation at 0° C. The diluted $SiCl_4$ vapor is carried to the reactor 20 by conduit 21.

Reactor

The reactor comprises a reaction situs 22 made up of a vessel 23 with inlet conduit 24, a sight tube 25 in parallel therewith. Vapor $SiCl_4$ in the carrier gas is introduced through a nozzle 26 into the liquid $NH_3$, which nozzle feeds into conduit 24. The liquid $NH_3$ is supplied to the reaction situs through conduit 27 from condenser 28.

It is essential that the reaction itself be carried out in the reaction situs 22 between vapor $SiCl_4$ and liquid ammonia. In order to maintain the ammonia in a liquid condition and yet to carry out the reaction at temperatures sufficiently high to be in the range of $-20°$ to $+40°$ C., and preferably 0° to $+30°$ C., the reaction is carried out under pressure. The use of a moderate degree of pressurization is recognized as practical for ammonia chemical engineering with little or no refrigeration requirements and provides more efficient heat transfer as well as less non-isothermal strain on the process equipment in comparison to carrying out the reaction at colder temperatures at atmospheric pressures. Carrying out the reaction at temperatures of 0°–50° C. while under pressure also permits the reaction to be designed so as to take place with neutral or slightly endothermic heat transfer. The vaporization of ammonia from the liquid ammonia to the carrier gas, brought into contact with the liquid ammonia in the situs 22, particularly vessel 23, takes place to produce a nearly eqiulibrium partial pressure of ammonia while in contact with the unreacted carrier gas. The vaporization takes up a quantity of heat similar to that of the exothermic heat of reaction, so that the overall reactor heat may be endothermic. The offsetting of heat transfers is depicted in FIG. 2 which is based upon numerical estimates of the thermochemical quantities. FIG. 2 shows the net reactor heat for synthesis of 10 grams of silicon nitride by reaction of saturated SiCl4 vapor feed with liquid ammonia. The overall heat is endothermic for reaction temperatures below 30° C. We have observed that the reaction is endothermic at zero degrees by virtue of a layer of ice buidup in an ice water bath around the apparatus where the reaction is occurring.

Pressurized System

The reactor is pressurized by use of a system 50 having back-pressure valves 29 and 30 which hold the pressures of the rear manifold line 32 and front manifold line 33 at 50-250 psig (as selected), optimally 75 psig. The front manifold line 33 leads to the outlet of the reaction vessel at 34 and the rear manifold line 32 connects with the vapor side of the reactor vessel. The front manifold line leads to a scrubber 35 and to exhaust. The rear manifold line leads to vacuum. The $N_2$ and $NH_3$ supplies are typically at 85-100 psi as regulated.

The use of pressurization for this system is also beneficial in that it requires reduced carrier gas in proportion to mass (due to the proportionality of higher SiCl4 vapor pressure), and there is a more equal offsetting of the exothermic reaction heat by the latent heat of vaporization. FIG. 3 illustrates the volume of carrier gas (calculated at 1 atmosphere and 0° C.) required for sythesis of 10 grams of silicon nitride by the reaction of saturated SiCl4, vapor feed with liquid ammonia at temperatures from −20° to +40° C. The amount of carrier gas increases more rapidly as lower temperatures are approached. At a typical temperature for unpressurized operation of −60° C., the estimated volume of carrier gas is 5300 liters (STP). High volumes of carrier gas increase the possibility of greater cation impurity (i.e., Fe, Ti and Ca). The volumes of carrier gas required become the most reasonable in the preferred operating temperature region of 0° to +30° C. Notably, this range is also where the net reactor heat (as shown in FIG. 2) is closest to zero kJ, which is important for minimization of heat transfer and scaled up reactor quantities. The use of pressure results in reduced processing costs in part by increased solubility of the chloride byproducts in the liquid ammonia above its normal boiling point.

Electronic grade ammonia was condensed in the condensor section of the reactor subassembly which was surrounded by a cooling medium at 0° C. with a system over-pressure maintained by a system back-pressure valve at 75 psig. The nitrogen sweeps the SiCl4 vapor from the saturator (at 25° C.), and the stream, after passing through the nozzle, mixes with a bypass stream of nitrogen to dilute the vapor below the concentration at which SiCl4 liquid would condense at 0° C. This diluted gaseous vapor of SiCl4 in the carrier gas is then injected through the nozzle into the liquid ammonia. The nozzle allows the addition of SiCl4 vapor at a relatively high rate which avoids clogging of any filters that may be employed in the reactor assembly. A white precipitate immediately forms and can be observed through a sight tube. The resultant product of reacting these two mediums is a liquid slurry containing a precipitate of silicon diimide in the liquid ammonia and having dissolved ammonium chloride.

Extractor

An outline of the reaction chemistry is as follows:

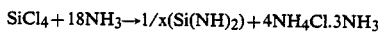

where the products are polymeric silicon diimide (not an amide) and ammonia chloride triammoniate (not NH4Cl).

The nitride is formed by thermal decomposition (in the absence of chlorine) of the imide:

If the chlorine is not removed, a more complex series of reaction occurs. The high temperature nitrogen/hydrogen/chlorine compounds tend to hold chlorine in the powder as high temperature phases which are known above 400° C. For high purity with respect to halides, removal of the halide from the low temperature product before imide decomposition is desirable.

To this end, this invention removes such halides during an extraction process by concentrating the imide precipitate in a portion of the liquid ammonia (at zone 36 of container 37) so that when such portion of such slurry or mixture is removed, the imide occupies a substantial fraction, almost 90%, of the slurry. When it is removed, the liquid of said slurry is the only portion thereof containing the chloride or halide contaminant in solution. The imide and liquid $NH_3$ mixture is transferred to container 37 by pressure drop when valve 40 and valve 41 are opened and closed respectively. The portion is transferred by a pressure drop from the 75 psig system to the 45 psig vapor pressure (which is the vapor pressure of ammonia at 0° C.) to the holding container and by the use of valves is separated from the reactor system. This invention requires only one essential rinsing or extraction process as opposed to the prior art which required repeated rinsing cycles to remove the halide impurity.

With the operating temperature levels contemplated by this invention, the halide solubility is increased in the ammonia. By pressurizing this system, further increases in solubility are obtained so that by extracting and separating the liquid from the precipitate, a considerable portion of the halide ion is physically removed.

Flash Evaporation

The vessel 37 is shaped so that at one end 36 it has a conical interior section; when such vessel is removed from the reaction apparatus and turned to a vertical orientation, the imide precipitate concentrates itself at the lower portion of such vessel in the conical section.

Then, aliquots of the slurry can be withdrawn by a double valve method (that is, alternately opening each of two valves 40 and 41 in series) and transferred to a collecting vessel 51 by gas evolved during pressure drop from the 120 psi ammonia vapor pressure at room temperature to about zero psig at an exhaust scrubber 35. This transfer is a method of flash evaporation which separates the ammonia liquid containing the dissolved ammonium chloride from the imide product.

Imide Decomposition

The imide product can then be heated under a low flow of nitrogen (such as 0.1 liter per minute) slowly to 400° C. and then more quickly to 1100° C. for a three hour hold. The calcined product is then transferred to a covered plate or surface made of silicon nitride in a box furnace for further decomposition and for crystallization as follows. The product is heated to 150° C. under vacuum to desorb water, and then to 600° C. at which point nitrogen is back-filled, and then to 1420° C. and held for three hours under a low flow of nitrogen. The resulting product is silicon nitride and may be analyzed by X-ray diffraction. It has been found to consist of a major phase of alpha silicon nitride with less than 1% oxygen carrying agents and less than 500 parts per million chloride ions on 0.1%. The silicon nitride powder contains little or no beta silicon nitride, has equiaxed particles, less than 0.08% carbon, and has a maximum particle size of less than one micron but greater than 0.1 micron. Such silicon nitride is extremely sinterable powder having highly controlled particle size, shape, surface area, and low impurity content. It has a high cation and anion purity (less than 400 ppm) which enables silicon nitride ceramic material to be produced which has a reliability and cost effective structural characteristic so that it can be used for advanced heat engines.

EXAMPLES

A series of six samples were processed according to the procedure of the preferred mode; the procedure was varied only with respect to system temperature and pressure, and reaction time. The materials ($SiCl_4$, $NH_3$, diluent $N_2$) used in the process were calculated as to moles, mass and volume used; the moles of ammonia lost and the net reactor heat was also calculated (see Table I).

Samples 1 and 6 were operated at temperatures and pressures outside the inventive range. Sample 1 shows that the oxygen content of the imide undesirably exceeded 5% and the HC was unusually high at 0.8%, all due to the exceedingly large volume of diluent $N_2$ that was required at such low pressures and temperatures. Operation of sample 1 is very uneconomical due to increased gas cost, increased refrigeration costs, and increased apparatus costs for exotic operational valve seats at $-60°$ C.

Sample 6 operated at exceedingly high pressures and high temperatures which increased the cost of apparatus detrimentally; the imide tends to thermally break down into silicon nitride having a higher content of undesirable beta silicon nitride.

While preferred embodiments of the invention have been illustrated and described, it will be understood that various changes and modifications may be made without departing from the invention, and it is intended to cover in the appended claims all such changes and modifications as fall within the true spirit and scope of the invention.

TABLE I

|  | Sample 1 | Sample 2 | Sample 3 | Sample 4 | Sample 5 | Sample 6 |
|---|---|---|---|---|---|---|
| System Pressure Above Ambient - psig | 13 | 39 | 75 | 75 | 235 | 600 |
| Reactor Temperature - °C. | −60° C. | −20° C. | 0° C. | 0° C. | +40° C. | +60° C. |
| Reaction Time - Minutes | 25 | 25 | 25 | Intervals of 25-12-12 | 25 | 25 |
| Ratio of $NH_3$ to $SiCl_4$ | 34 | 34 | 34 | 34 | 34 | 34 |
| Moles of $SiCl_4$ - mol | .214 | .214 | .214 | .214 | .214 | .214 |
| Mass of $SiCl_4$ - grams | 36.12 | 36.12 | 36.12 | 36.12 | 36.12 | 36.12 |
| Volume of $SiCl_4$ - ml | 24.40 | 24.40 | 24.40 | 24.40 | 24.40 | 24.40 |
| Moles of Liquid $NH_3$ - mole | 7.27 | 7.27 | 7.27 | 7.27 | 7.27 | 7.27 |
| Mass of Liquid $NH_3$ - grams | 123.8 | 123.8 | 123.8 | 123.8 | 123.8 | 123.8 |
| Volume of Liquid $NH_3$ - $cm^3$ | 193.9 | 193.9 | 193.9 | 193.9 | 193.9 | 193.9 |
| Vapor Pressure of $SiCl_4$ - kPa | .173 | 3.39 | 10.139 | 10.139 | 55.75 | 90.3 |
| Moles of Diluent $N_2$ - mol | 236.1 | 23.19 | 12.39 | 12.39 | 6.39 | 1.2 |
| Mass of Diluent $N_2$ - grams | 6613.98 | 649.6 | 347.3 | 347.3 | 179.0 | 31.2 |
| Volume of Diluent $N_2$ - liters | 5288.65 | 519.46 | 277.7 | 277.7 | 143.14 | 23.4 |
| Moles of $NH_3$ Lost - mole | 27.29 | 2.31 | 2.79 | 2.79 | 2.74 | 2.70 |
| Net Reactor Heat - kJ | 492.88 | 132.98 | 63.38 | 63.38 | −13.57 | −343.6 |
| % $O_2$ in Imide (due to carrier) | 8.0 | .35 | .3 | .3 | .25 | .22 |
| % HC in Imide (due to carrier) | .8 | .035 | .03 | .03 | .025 | .021 |
| Cation Impurity in Imide - ppm | 1000 | <300 | <200 | <200 | <400 | <600 |
| Chloride Impurity - in $Si_3N_4$ Without Filter | — | <1.2 | <.1 | <.08 | <.09 | <.08 |
| Chloride Impurity - in $Si_3N_4$ With Filter | — | <.02 | <.01 | <.01 | <.01 | <.02 |
| % Carbon in $Si_3N_4$ | .20 | .15 | .08 | .08 | .08 | .08 |
| % Alpha Phase in $Si_3N_4$ | >85 | >90 | >90 | >90 | >90 | >90 |

We claim:

1. A method of making silicon nitride precursor, comprising:
    (a) reacting silicon halide vapor with liquid ammonia at a situs in an inert environment having a pressure equal to or greater than 35 psig and which environment is effectively devoid of organic contaminants, said reaction producing a mixture of precipitated silicon imide in liquid ammonia having dissolved ammonium halide;

(b) extracting a portion of said mixture from said situs; and (c) separating said liquid from said precipitate of said portion.

2. The method as in claim 1, in which in step (c) said imide is concentrated in said portion to above 80%.

3. The method as in claim 1, in which said separation is carried out by flash evaporation.

4. The method as in claim 1, in which said silicon halide vapor is carried to said liquid ammonia in a non-reactive carrier gas.

5. The method as in claim 4, including controlling the reaction between said carrier gas and liquid ammonia to provide a neutral or net endothermic heat transfer therebetween, said control being carried out by vaporization of ammonia into said carrier gas to achieve an equilibrium partial pressure of ammonia which balances or substantially balances the exothermic reaction of the reaction of silicon halide with liquid ammonia resulting in a substantially neutral net heat transfer.

6. The method as in claim 4, in which the exothermic heat of reaction of halide/ammonia is offset by the latent heat of vaporization of ammonia into the carrier gas.

7. The method as in claim 1, in which the silicon halide is $SiCl_4$.

8. The method as in claim 4, in which said carrier gas is comprised of nitrogen or argon.

9. The method as in claim 1, in which said reaction situs is formed of metallic tubes or containers.

10. The method as in claim 1, in which the temperature of said reaction situs is controlled to be in the range of $-20°$ to $+40°$ C.

11. The method as in claim 1, in which the pressure of said environment is in the range of 35–250 psig.

12. The method as in claim 1, in which in steps (b) and (c) said portion is anerobically transferred to a controlled atmosphere furnace by gravitationally concentrating the precipitate in a conical zone and withdrawing the precipitate from the conical zone along with a reduced proportion of liquid.

13. The method as in claim 1, in which said step (a) is carried out in a series of batches by repeatedly introducing a stream of $SiCl_4$ and carrier gas into a refilled reaction situs of liquid ammonia.

14. The method as in claim 1, in which the molar ratio of liquid $NH_3$ to the ammonium halide is in the range of 18–200.

* * * * *

UNITED STATES PATENT AND TRADEMARK OFFICE
CERTIFICATE OF CORRECTION

PATENT NO. : 4,732,746

DATED : March 22, 1988

INVENTOR(S) : Crosbie, et al.

It is certified that error appears in the above-identified patent and that said Letters Patent is hereby corrected as shown below:

Column 1, line 5, before "Background of the Invention" please insert --

Government Interest

This invention was made with Government support under Contract No. 86X-22001C (Martin Marietta ORNL) awarded by the Department of Energy.--.

Signed and Sealed this

Thirtieth Day of June, 1992

Attest:

DOUGLAS B. COMER

Attesting Officer

Acting Commissioner of Patents and Trademarks